(12) United States Patent
Du

(10) Patent No.: US 11,113,170 B2
(45) Date of Patent: Sep. 7, 2021

(54) TECHNOLOGIES FOR MANAGING MEMORY ON COMPUTE DEVICE

(71) Applicant: INTEL CORPORATION, Santa Clara, CA (US)

(72) Inventor: Xiaoyong Du, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 281 days.

(21) Appl. No.: 16/311,877

(22) PCT Filed: Jul. 26, 2016

(86) PCT No.: PCT/CN2016/091680
§ 371 (c)(1),
(2) Date: Dec. 20, 2018

(87) PCT Pub. No.: WO2018/018398
PCT Pub. Date: Feb. 1, 2018

(65) Prior Publication Data
US 2019/0205237 A1   Jul. 4, 2019

(51) Int. Cl.
G06F 11/34        (2006.01)
G06F 9/445        (2018.01)
G06F 11/30        (2006.01)

(52) U.S. Cl.
CPC ...... *G06F 11/3433* (2013.01); *G06F 9/44505* (2013.01); *G06F 11/3037* (2013.01); *G06F 11/3419* (2013.01); *G06F 11/3428* (2013.01)

(58) Field of Classification Search
CPC ............. G06F 11/3037; G06F 11/3419; G06F 11/3428; G06F 11/3433; G06F 9/44505

(Continued)

(56) References Cited

U.S. PATENT DOCUMENTS

| 9,369,537 B1* | 6/2016 | Mathew .............. G06F 11/3438 |
| 2012/0324481 A1 | 12/2012 | Xia et al. |
| 2016/0292060 A1* | 10/2016 | Mathew .............. G06F 11/3438 |

FOREIGN PATENT DOCUMENTS

| CN | 103345397 | 10/2013 |
| CN | 104461725 | 3/2015 |
| CN | 104731683 | 6/2015 |

OTHER PUBLICATIONS

Fu Haiwang ,"Mobile phone memory monitoring method and system", CN104731683 A, IP.com, Published on Jun. 24, 2015.*

(Continued)

*Primary Examiner* — John H Le
(74) *Attorney, Agent, or Firm* — Hanley, Flight & Zimmerman, LLC

(57) ABSTRACT

Technologies for managing memory on a compute device are disclosed. The compute device is configured to determine the quality of a user experience of the compute device when a certain combination of applications are running on the compute device and stores an indication of the quality of the user experience that corresponds to that combination of applications. At a later time, such as when a user selects an application to be launched, the compute device may check if the current combination of applications is expected to have an acceptable quality of a user experience. If not, the compute device may kill one or more of the current combination of applications to improve the expected quality of the user experience.

25 Claims, 5 Drawing Sheets

(58) Field of Classification Search
USPC .......................................................... 702/182
See application file for complete search history.

(56) References Cited

OTHER PUBLICATIONS

PCT Search Report and Written Opinion prepared for PCT/CN2016/091680, completed Apr. 10, 2017.

* cited by examiner

TECHNOLOGIES FOR MANAGING MEMORY ON COMPUTE DEVICE

CROSS REFERENCE TO RELATED APPLICATIONS

The present application is a national stage entry under 35 USC § 371(b) of International Application No. PCT/CN2016/091680, filed Jul. 26, 2016.

BACKGROUND

Memory management is an important task for any modern computing system. Typically, when not enough physical memory is available, some of the content of the physical memory can be transferred to a secondary storage location, such as "swap space" on a hard drive. However, embedded systems or mobile devices such as cell phones may not employ this approach.

In such systems, when a low memory condition is encountered, a low memory application killer is used to kill one or more of the applications running on the compute device. Such an approach requires a low memory condition to exist before addressing the issue, which can lead to an unacceptable quality of a user experience due to applications running slowly, being unresponsive to user input, etc.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
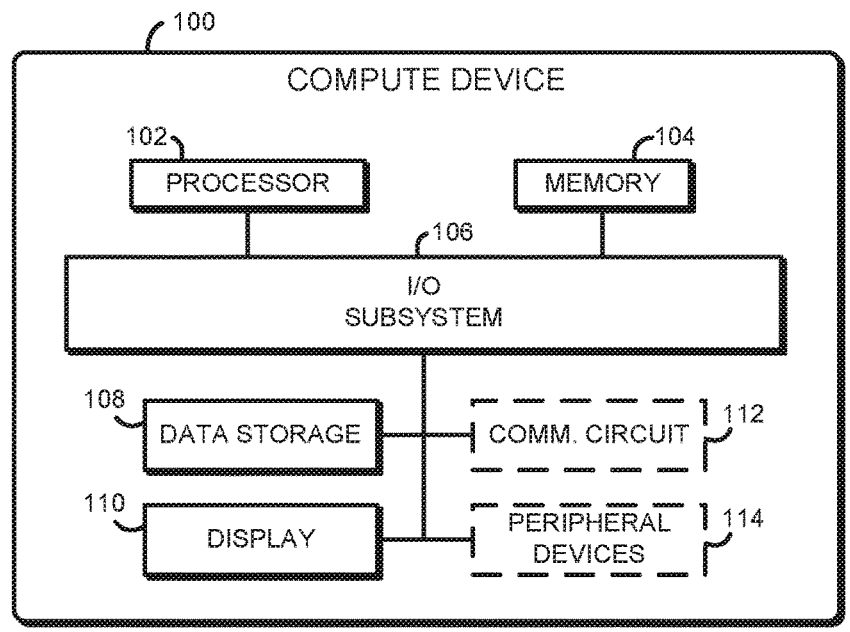
FIG. 1 is a simplified block diagram of at least one embodiment of a compute device for managing memory and the quality of a user experience.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 100 is configured to manage memory based on the past qualities of user experiences with regard to applications executed on the compute device 100. To do so, the compute device 100 is configured to determine an indication of the quality of a user experience (such as by measuring a system benchmark) while the compute device 100 is running various combinations of applications, and to store the indications in a database or other storage. When a new application is selected by a user for launch, the compute device 100 checks the database for the current combination of applications (i.e., the applications presently running on the compute device, including the selected application) and, if a relevant entry is found, determines an expected quality of a user experience for that combination of applications. If the expected quality of a user experience is acceptable, all of the applications in the current combination may be allowed to continue to run. If the expected quality of a user experience is unacceptable, one or more of the current combination of applications will be killed to improve the expected quality of a user experience.

The compute device 100 may be embodied as any type of compute device capable of performing the functions described herein. For example, the compute device 100 may be embodied as or otherwise be included in, without limitation, a smartphone, a cellular phone, a server computer, a desktop computer, an embedded computing system, a System-on-a-Chip (SoC), a tablet computer, a notebook computer, a laptop computer, a wearable computer, a handset, a messaging device, a camera device, a multiprocessor system, a processor-based system, a consumer electronic device, and/or any other computing device. The illustrative compute device 100 includes a processor 102, a memory 104, an input/output (I/O) subsystem 106, a data storage 108, and a display 110. In some embodiments, one or more of the illustrative components of the compute device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100 on a single integrated circuit chip.

The data storage 108 may be embodied as any type of device or devices configured for the short-term or long-term storage of data. For example, the data storage 108 may include any one or more memory devices and circuits, memory cards, hard disk drives, solid-state drives, or other data storage devices.

The display 110 may be embodied as any type of display on which information may be displayed to a user of the compute device 100, such as a touchscreen display, a liquid crystal display (LCD), a light emitting diode (LED) display, a cathode ray tube (CRT) display, a plasma display, an image projector (e.g., 2D or 3D), a laser projector, a heads-up display, and/or other display technology.

In some embodiments, the compute device 100 may include other or additional components, such as those commonly found in a compute device. For example, the compute device 100 may also have a communication circuit 112 and/or peripheral devices 114. The peripheral devices 114 may include a keyboard, a mouse, etc. The communication circuit 112 may be embodied as any type of communication circuit, device, or collection thereof, capable of enabling communications between the compute device 100 and other devices. To do so, the communication circuit 112 may be configured to use any one or more communication technology and associated protocols (e.g., Ethernet, Bluetooth®, Wi-Fi®, WiMAX, near field communication (NFC), etc.) to effect such communication.

Figure 2:
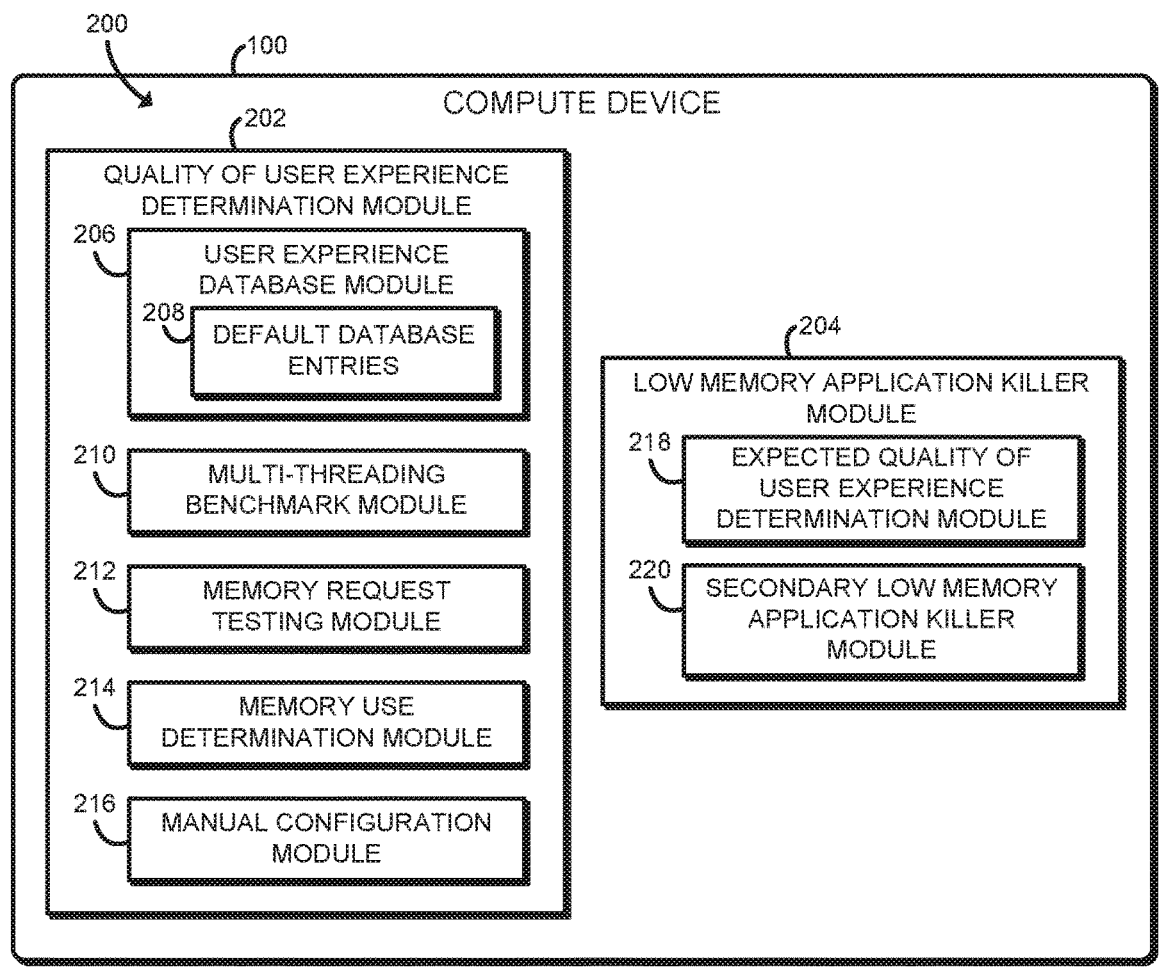
FIG. 2 is a block diagram of at least one embodiment of an environment that may be established by the compute device of FIG. 1.

Referring now to FIG. 2, in use, the compute device 100 may establish an environment 200. The illustrative environment 200 includes a quality of user experience determination module 202 and a low memory application killer module 204. The various modules of the environment 200 may be embodied as hardware, software, firmware, or a combination thereof. For example, the various modules, logic, and other components of the environment 200 may form a portion of, or otherwise be established by, the processor 102 or other hardware components of the compute device 100. As such, in some embodiments, one or more of the modules of the environment 200 may be embodied as circuitry or collection of electrical devices (e.g., a quality of user experience determination circuit 202, a low memory application killer circuit 204, etc.). It should be appreciated that, in such embodiments, one or more of the circuits (e.g., the quality of user experience determination circuit 202, the low memory application killer circuit 204, etc.) may form a portion of one or more of the processor 102, the memory 104, the I/O subsystem 106, and/or the data storage 108. Additionally, in some embodiments, one or more of the illustrative modules may form a portion of another module and/or one or more of the illustrative modules may be independent of one another.

The quality of user experience determination module 202 is configured to determine the quality of a user experience of a user of the compute device 100 associated with a combination of applications (i.e., the user experience while the compute device 100 is running the combination of applications). The determined quality of a user experience may be embodied as any type of data indicative of a level of quality of the experience of the user while using the compute device 100. In some embodiments, the quality of a user experience is indicative or otherwise based on the quality of the user's experience with a user interface of the computing device 100. The quality of the user's experience may be determined based on monitored or determined criteria related to the operation of the compute device 100 (e.g., overall performance level, latency, responsiveness, time taken for an application to perform a specific task, susceptibility to crashes, etc.) or on user feedback (e.g., the user may supply a confirmation of a high quality experience with a particular set of executed applications). In many instances, a poor or unacceptable quality of a user experience may be caused by low memory. The quality of user experience determination module 202 includes a user experience database module 206. Each illustrative entry in the user experience database module 206 includes a combination of applications associated with the entry and an indication of the level of quality of the user experience associated with running the combination of applications. The indication of the quality of the user experience may be represented in any manner, such as with a single binary variable (indicating an acceptable or unacceptable experience), a single variable with a wide range of values (such as a 32-bit integer), or with several variables, each indicating a different aspect of the user experience. The user experience database module 206 includes default database entries 208, which may be included in the user experience database module 206 at the time of manufacture of the compute device 100 (or at the time of installation or upgrade of the operating system or other software of the compute device 100). The default database entries 208 may indicate the quality of a user experience for common or default combinations of applications.

The quality of user experience determination module 202 may determine the quality of a user experience in any number of ways, including with use of a multi-threading benchmark module 210, a memory request testing module 212, a memory use determination module 214, and/or a manual configuration module 216. It should be appreciated that the quality of user experience determination module 202 may determine the quality of a user experience using any combination of the modules 210-216. When the compute device 100 determines an indication of the quality of a user experience associated with the applications running on the compute device 100, the compute device 100 stores the indication in the user experience database module 206, such as by adding or updating an entry.

The multi-threading benchmark module 210 is configured to determine the quality of a user experience based on a multi-threading benchmark. In the illustrative embodiment, the multi-threading benchmark module 210 schedules one or more threads to be executed at a certain time, and compares the scheduled execution time of the one or more scheduled threads to the actual execution time. If the compute device 100 is not low on resources (such as space in the memory 104), the threads are likely to be executed when scheduled. If the compute device 100 is low on resources (such as space in the memory 104), then the threads are more likely to be executed at a later time than scheduled. As such, the execution time of the scheduled threads may be used to infer an indication of whether the compute device 100 is low on resources (and, therefore, an indication of the quality of a user experience).

The memory request testing module 212 is configured to request one or more memory allocations of the memory 104 and to determine how long it takes for the request to be fulfilled (if it ever is). Again, if the compute device 100 is low on resources (such as space in the memory 104), then the memory request is likely to take longer, and if the compute device 100 is not low on resources (such as space in the memory), the memory request is likely to take less time. As such, the time for a request for memory to be fulfilled may be used to infer an indication of whether the compute device 100 is low on resources (and, therefore, an indication of the quality of a user experience).

The memory use determination module 214 is configured to determine an amount of free memory space available in the memory 104. As noted above, low or no memory available likely indicates a poor or low quality of user experience.

The manual configuration module 216 is configured to receive an input from a user of the compute device 100 indicating the quality of the user experience associated with a combination of applications. In some cases, the compute device 100 may provide a prompt to the user for feedback on the current combination of applications. In other cases, the user may navigate to an interface which may allow the user to add, update, or remove the entries in the user experience database module 206.

The low memory application killer module 204 is configured to kill (e.g., stop, exit, halt, etc.) one or more applications when certain conditions are met. The low memory application killer module 204 includes an expected quality of user experience determination module 218, and may kill one or more of the applications of the current combination of applications if the expected quality of user experience determination module 218 indicates an unacceptable expected performance with the current combination of applications. In some embodiments, the indication of the quality of a user experience stored in the user experience database module 206 is compared against a threshold value to determine if the indicated quality of user experience is acceptable. The illustrative low memory application killer module 204 checks the expected quality of user experience each time an application is launched.

The expected quality of user experience determination module 218 is configured to determine an expected quality of a user experience of a current combination of applications based on relevant entries stored in the user experience database. In the illustrative embodiment, a relevant entry is any entry that includes the active application in its combination of applications. The active application is the application with which the user most recently interacted. If a user just selected an application to be launched, the selected application is considered the active application, even if it has not yet launched. If more than one relevant entry is in the user experience database module 206, the low memory application killer module 204 may determine which entry or entries are most relevant based on any metric, such as the number of applications in common, the number of applications in the combination of applications of the entry that also appear in the current combination of applications, or the number of applications in the current combination of applications that also appear in the combination of applications of the entry.

For example, if an entry in the user experience database module 206 has a combination of applications that matches the current combination of applications and indicates an (un)acceptable quality of a user experience, the expected quality of user experience determination module 218 will determine that the expected quality of the user experience is (un)acceptable. In another example, if an entry in the user experience database module 206 has a combination of applications that includes the current combination of applications (and one or more additional applications) and indicates an (un)acceptable quality of a user experience, the expected quality of user experience determination module 218 may determine that the expected quality of the user experience is (un)acceptable. In yet another example, if an entry in the user experience database module 206 has a combination of applications that are included in the current combination of applications (but does not include all of the current combination) and indicates an (un)acceptable quality of a user experience, the expected quality of user experience determination module 218 may determine that the expected quality of the user experience is (un)acceptable.

It should be appreciated that, throughout the present specification, the "current" or "present" combination of applications includes an application that a user has selected to be launched, even if that application has not yet launched. For example, in some embodiments, a user may select an application to be launched, and the expected quality of user experience determination module 218 may determine an expected quality of the user experience of a combination of applications including the applications running prior to the user's selection and the application indicated by the user's selection prior to launching the application. Such an approach may proactively prevent a situation where the system would otherwise be low on resources.

The secondary low memory application killer module 220 is configured to kill one or more applications running on the compute device 100 when a certain condition related to low memory is reached, such as when there is insufficient memory to fulfill a memory request, when available memory is below a threshold, etc. The secondary low memory application killer module 220 may select which applications are killed based on several possible factors, such as memory footprint, recency of use, etc. The secondary low memory application killer module 220 may be used when a relevant entry is not found in the user experience database module 206. Of course, there may be additional conditions which cause the compute device 100 to use the secondary low memory application killer module 220, such as when there is insufficient memory to fulfill a memory request.

Figure 3:
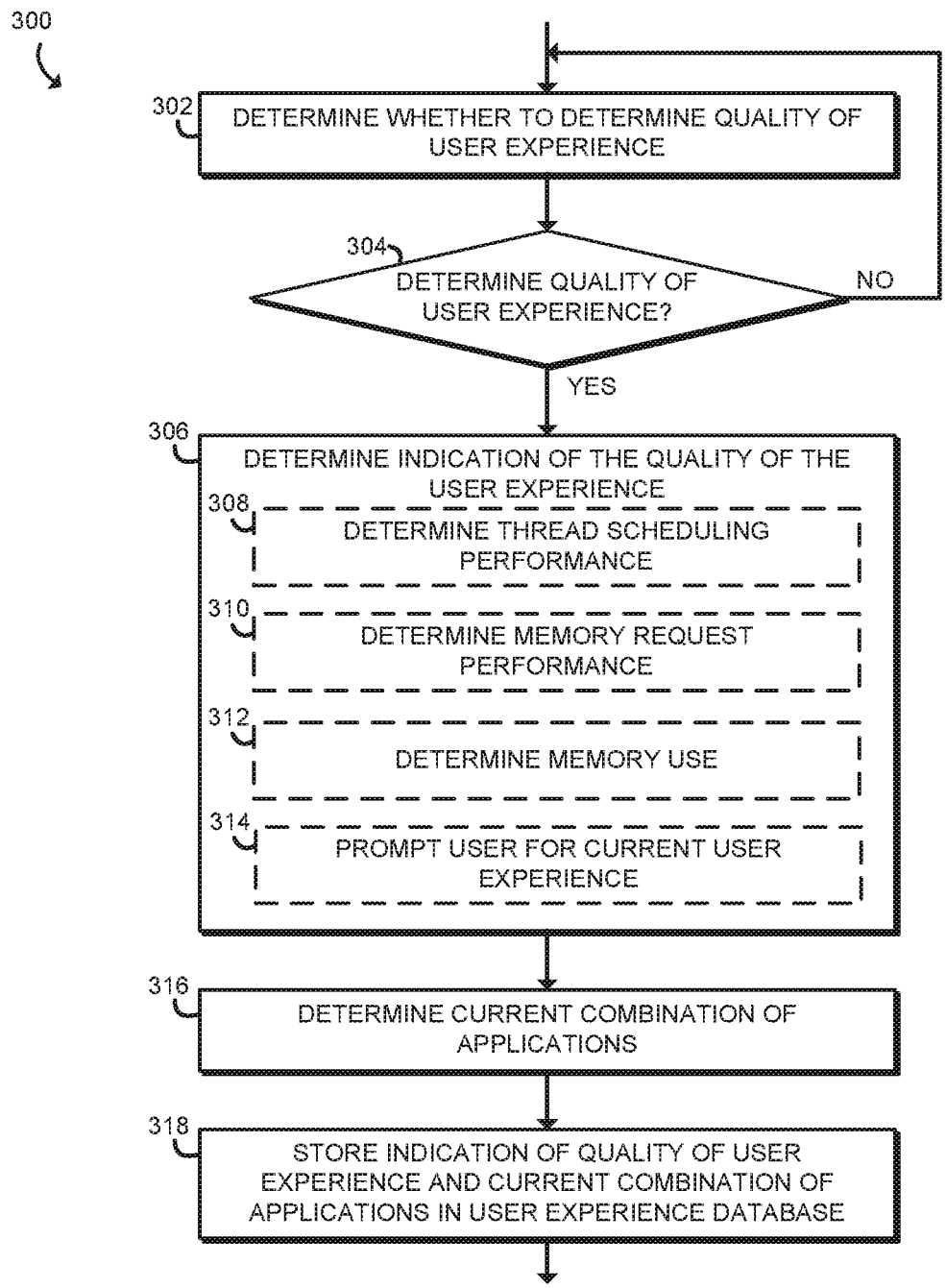
FIG. 3 is a simplified flow diagram of at least one embodiment of a method for determining the quality of a user experience of the compute device of FIG. 1.

Referring now to FIG. 3, in use, the compute device 100 may execute a method 300 for determining the quality of a user experience of the compute device 100. It should be appreciated that, in some embodiments, the method 300 may be executed by one or more of the modules of the environment 200. The method begins in block 302, in which the compute device 100 determines whether to determine the quality of a user experience with the operation of the compute device 100. The compute device 100 may decide to determine the quality of the user experience based on any relevant factor, such as a user selecting an additional application to be launched, based on a certain amount of time elapsed since the previous determination of the quality of a user experience, and/or based on an operating characteristic of the compute device 100 such as low memory or insufficient memory to fulfill a memory request.

In block 304, if the compute device 100 decides not to determine the quality of a user experience, the method 300 loops back to block 302. If, however, the compute device 100 decides to determine the quality of a user experience, the method 300 proceeds to block 306. In block 306, the compute device 100 determines an indication of the quality of the present user experience with the operation of the compute device 100. As discussed above, the indication may be embodied as any type of data indicative of the level of quality of the user's experience with regard to the operation of the compute device 100 (e.g., a user interface of the compute device 100) while executing the current combination of applications. The compute device 100 may use any suitable methodology to determine the indication of the quality of the user experience. For example, the compute device 100 may determine thread scheduling performance in block 308. To do so, the compute device 100 may, in one embodiment, schedule one or more threads to be executed at a certain time, and compare the scheduled execution time of the one or more scheduled threads to the actual execution time. In another example, the compute device 100 may determine performance of a memory request in block 310. To do so, the compute device 100 may request one or more memory allocations of the memory 104 and to determine how long it takes for the request to be fulfilled (if it ever is). In yet another example, the compute device 100 may determine memory use in block 312, such as by determining an amount of free memory space available in the memory 104. In still another example, the compute device 100 may prompt the user for the quality of the current user experience and receive an indication of the quality of the user experience from the user in block 314.

In block 316, the compute device 100 determines the current combination of applications that are running or executing on the compute device 100 (i.e., the combination of applications associated with the user experience determined in block 306). Subsequently, in block 318, the compute device 100 stores an indication of the quality of the user experience associated with the current combination of applications in the user experience database module 206.

Figure 4:
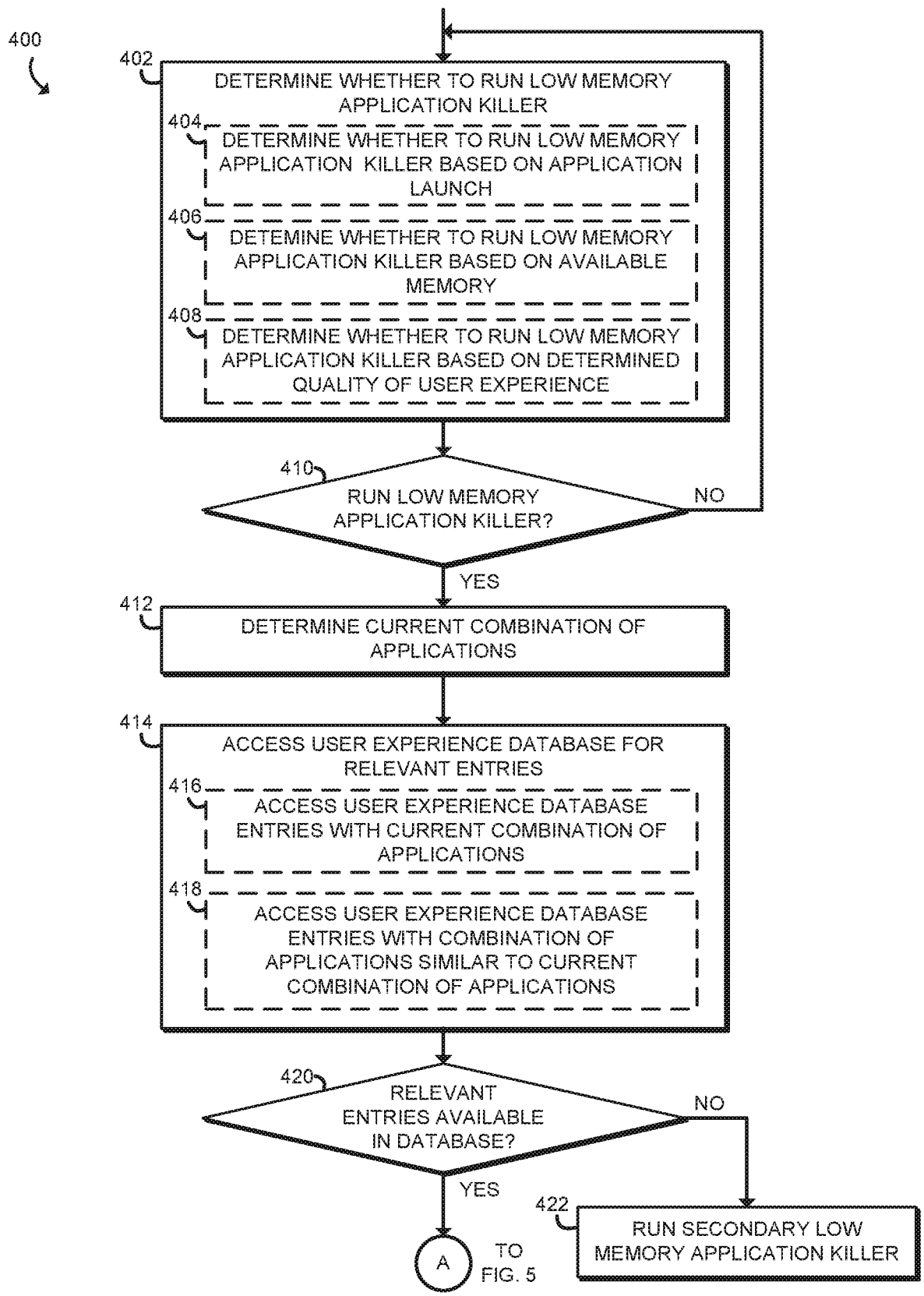
FIGS. 4 & 5 are a simplified flow diagram of at least one embodiment of a method for managing memory on the compute device of FIG. 1.

Referring now to FIG. 4, in use, the compute device 100 may execute a method 400 for killing one or more applications running on the compute device 100. It should be appreciated that, in some embodiments, the method 400 may be executed by one or more of the modules of the environment 200. The method begins in block 402 in which the compute device 100 determines whether to run a low memory application killer. As part of determining whether to run the low memory application killer, the compute device 100 may determine whether to run the low memory application killer based on an application launch in block 404, determine whether to run the low memory application killer based on available memory in block 406, and/or determine whether to run the low memory application killer based on a determined quality of the user experience (e.g., the quality of the user experience determined by executing the method 300 in FIG. 3) in block 408. In some embodiments, the compute device 100 may consider other factors, such as how long since the low memory application killer was run, an operating characteristic of the compute device 100, etc.

In block 410, if the compute device 100 determines not to run the low memory application killer, the method 400 loops back to block 402 to continue checking whether to run the low memory application killer. However, if the compute device 100 decides to determine the quality of a user experience, the method 400 proceeds to block 412. In block 412, the compute device 100 determines the current combination of applications that are running on the compute device 100. In block 414, the compute device 100 accesses the user experience database module 206 for relevant entries based on the current combination of applications. In the illustrative embodiment, an entry is considered relevant if it includes the active application in its combination of applications. The compute device 100 accesses one or more entries in the user experience database module 206 that include an indication of the quality of a user experience with the same combination of applications as the current combination of applications (if such an entry exists) in block 416. Additionally or alternatively, the compute device 100 may access one or more entries in the user experience database module 206 that include an indication of the quality of a user experience with a similar combination of applications as the current combination of applications in block 416. A similar combination of applications may be a combination of applications that includes some or all of the applications in the current combination, and may include one or more additional applications not present in the current combination and/or may not include some of the applications present in the current combination.

In block 420, if relevant entries are not available in the user experience database module 206, the method proceeds to block 422. In block 422, the compute device 100 runs a secondary memory application killer, which, as described above, may kill one or more applications based on factors such as low available memory and/or a determination that there is not enough available memory to fulfill a memory request.

Figure 5:
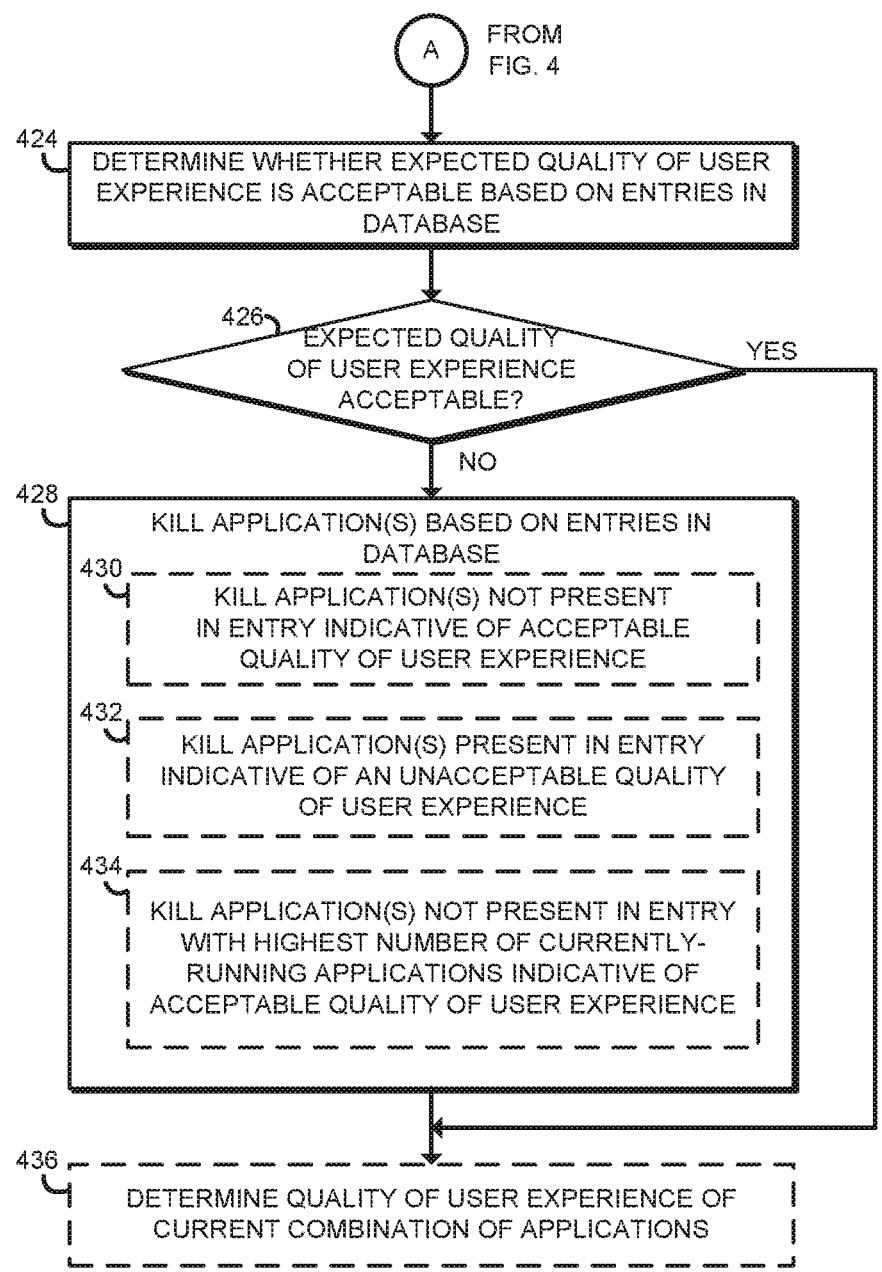

Referring back to block 420, if relevant entries are available in the user experience database, the method proceeds to block 424 of FIG. 5, in which the compute device 100 determines whether an expected quality of the user experience is acceptable based on the entries accessed from the user experience database module 206 and the current combination of applications, as described above in regard to the expected quality of user experience determination module 218. For example, if an entry is accessed with an indication of the quality of a user experience associated with a combination of applications that is the same as the current combination of applications, the expected quality of the user experience may be determined to be acceptable if the indication of that entry indicates an acceptable quality of the user experience.

If the expected quality of the user experience of the current combination of applications is acceptable, the method jumps to block 436 discussed below. If, however, the expected quality of the user experience is not acceptable, the method proceeds to block 428, in which the compute device 100 kills one or more of the current combination of applications. The compute device 100 may select which of the current combination of applications are killed based on several criteria. For example, the compute device 100 may kill the application(s) that are not present in a relevant entry that indicates an acceptable quality of the user experience in block 430 and may kill the application(s) that are present in a relevant entry that indicates an unacceptable quality of the user experience in block 432. If more than one entry is determined to be relevant, the compute device 100 may determine which entry is most relevant, and kill applications based on that entry. For example, the compute device 100 may kill the application(s) that are not present in the entry that has the highest number of currently-running applications and that indicates an acceptable quality of the user experience in block 434. Of course, the compute device 100 may additionally or alternatively consider factors such as memory footprint of the applications, recency of use, etc.

Optionally, in block 436, the compute device 100 may determine the quality of the user experience of the current combination of applications after killing some of the applications, and updating the user experience database module 206 as appropriate.

Figure 6:
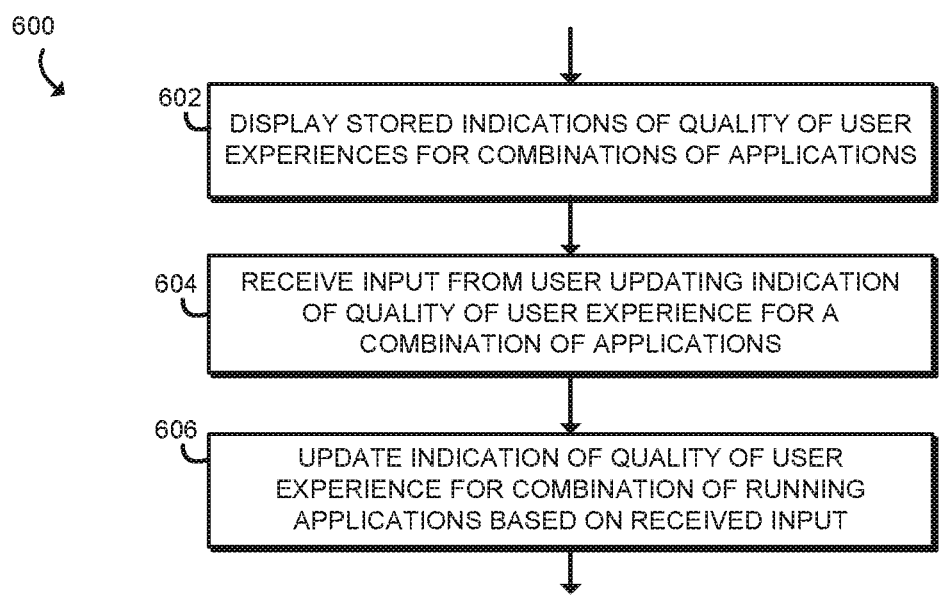
FIG. 6 is a simplified flow diagram of at least one embodiment of a method for modifying a stored indication of the quality of a user experience based on an input from a user that may be executed by the compute device of FIG. 1.

Referring now to FIG. 6, in use, the compute device 100 may execute a method 600 for modifying a stored indication of the quality of a user experience based on an input from a user of the compute device 100. It should be appreciated that, in some embodiments, the method 600 may be executed by one or more of the modules of the environment 200. The method 600 begins in block 602, in which the compute device 100 displays to the user one or more indications of the quality of user experiences associated with various combinations of applications that may be present in one or more entries of the user experience database module 206.

In block 604, the compute device 100 receives an input from the user updating the quality of the user experience for a combination of applications. In block 606, the compute device 100 updates the corresponding indication of the quality of the user experience associated with the combination of applications in the user experience database module 206.

EXAMPLES

Illustrative examples of the devices, systems, and methods disclosed herein are provided below. An embodiment of the devices, systems, and methods may include any one or more, and any combination of, the examples described below.

Example 1 includes a compute device for managing memory use on the compute device, the compute device comprising a low memory application killer module to determine a current combination of applications running on the compute device; retrieve, from a database of the compute device, one or more entries of a plurality of entries of the database, wherein each entry of the plurality of entries is associated with a combination of applications of a plurality of combinations of applications and comprises an indication of the quality of a user experience associated with the corresponding combination of applications; determine an expected quality of a user experience associated with the current combination of applications based on the one or more indications of the quality of the user experiences associated with the one or more entries; and kill one or more of the current combination of applications based on the expected quality of the user experience associated with the current combination of applications.

Example 2 includes the subject matter of Example 1, and further including a quality of user experience determination module to receive, for each of the plurality of combinations of applications, one or more input commands from a user of the compute device to launch each of the applications of the corresponding combination of applications; run, for each of the plurality of combinations of applications, each of the applications of the corresponding combination of applications in response to the corresponding one or more input commands; determine, for each of the plurality of combinations of applications, the indication of the quality of the user experience associated with the corresponding combination of applications while the compute device is running the corresponding combination of applications; and store, for each of the plurality of combinations of applications, the indication of the quality of the user experience associated with the corresponding combination of applications in the database.

Example 3 includes the subject matter of any of Examples 1 and 2, and wherein to determine, for each of the plurality of combinations of applications, the indication of the quality of the user experience associated with the corresponding combination of applications comprises to schedule, for each of at least one combination of applications of the plurality of combinations of applications, a thread to run at a first time; run, for each of the at least one combination of applications, the corresponding thread at a second time; determine, for each of the at least one combination of applications, a time difference between the corresponding second time and the corresponding first time; and determine, for each of the at least one combination of applications, the indication of the quality of the user experience associated with the corresponding combination of applications based on the corresponding time difference.

Example 4 includes the subject matter of any of Examples 1-3, and wherein to determine, for each of the plurality of combinations of applications, the indication of the quality of the user experience associated with the corresponding combination of applications comprises to request, for each of at least one combination of applications of the plurality of combinations of applications, an allocation of memory of the compute device at a first time; receive, for each of the at least one combination of applications, the corresponding allocation of memory at a second time; determine, for each of the at least one combination of applications, a time difference between the corresponding second time and the corresponding first time; and determine, for each of the at least one combination of applications, the indication of quality of the user experience associated with the corresponding combination of applications based on the corresponding time difference.

Example 5 includes the subject matter of any of Examples 1-4, and wherein to determine, for each of the plurality of combinations of applications, the indication of quality of the user experience associated with the corresponding combination of applications comprises to determine, for each of at least one combination of applications of the plurality of combinations of applications, an available amount of memory of the compute device, and determine, for each of the at least one combination of applications, the indication of quality of the user experience associated with the corresponding combination of applications based on the corresponding available amount of memory.

Example 6 includes the subject matter of any of Examples 1-5, and further including a user experience determination module to receive, for each of the plurality of combinations of applications, an input from a user of the compute device comprising the corresponding indication of quality of the user experience associated with the corresponding combination of applications and store, for each of the plurality of combinations of applications, the indication of quality of the user experience associated with the corresponding combination of applications in the database.

Example 7 includes the subject matter of any of Examples 1-6, and wherein to determine the current combination of applications running on the compute device comprises to receive, from a user of the compute device, a command to launch a selected application; determine, in response to receipt of the command to launch the selected application, the current combination of applications running on the compute device, wherein the selected application is included in the current combination of applications; and launch the selected application, wherein to kill the one or more of the current combination of applications comprises to kill the one or more of the current combination of applications prior to the launch of the selected application.

Example 8 includes the subject matter of any of Examples 1-7, and wherein the one or more entries comprise an indication of an acceptable quality of a user experience associated with an acceptable combination of applications including the selected application and one or more additional applications of the current combination, wherein to kill the one or more of the current combination of applications comprises to determine that the one or more of the current combination of applications are not included in the acceptable combination of applications.

Example 9 includes the subject matter of any of Examples 1-8, and wherein the one or more entries comprise an indication of an unacceptable quality of a user experience associated with an unacceptable combination of applications including the selected application and one or more additional applications of the current combination, wherein to kill the one or more of the current combination of applications comprises to determine that the one or more of the current combination of applications are included in the unacceptable combination of applications.

Example 10 includes the subject matter of any of Examples 1-9, and wherein the one or more entries comprise two or more indications of an acceptable quality of a user experience associated with two or more acceptable combinations of applications including the selected application and one or more additional applications of the current combination, wherein to kill the one or more of the current combination of applications comprises to determine which acceptable combination of the two or more acceptable combinations of applications has more applications in common with the current combination of applications, and determine that the one or more of the current combination of applications are not included in the acceptable combination having the most applications in common with the current combination of applications.

Example 11 includes the subject matter of any of Examples 1-10, and wherein the one or more entries comprise an indication of an unacceptable quality of a user experience associated with the current combination of applications.

Example 12 includes the subject matter of any of Examples 1-11, and wherein the one or more entries comprise an indication of an unacceptable quality of a user experience associated with a combination of applications that includes the current combination of applications and one or more additional applications.

Example 13 includes the subject matter of any of Examples 1-12, and wherein the low memory application killer module is further to determine a second current combination of applications running on the compute device at a time different from the running of the current combination of applications; determine whether the database includes any entry indicative of the quality of a user experience associated with the second current combination of applications; and apply, in response to a determination that the database does not include any entry indicative of the quality of a user experience associated with the second current combination of applications, a secondary low memory application killer algorithm.

Example 14 includes the subject matter of any of Examples 1-13, and further including a quality of user experience determination module to display, on a display of the compute device, an interface for a user of the compute device to modify the entries of the plurality of entries of the database; receive, from the user, an instruction to modify a selected entry of the plurality of entries; and update the selected entry of the database based on the instruction from the user.

Example 15 includes the subject matter of any of Examples 1-14, and further including a quality of user experience determination module to display, on a display of the compute device, an interface for a user of the compute device to provide an indication of the quality of a user experience associated with the current combination of applications; receive, from the user, the indication of quality of the user experience associated with the current combination of applications; and update the database based on the indication of quality of the user experience associated with the current combination of applications.

Example 16 includes a method for managing memory use on a compute device, the method comprising determining, by the compute device, a current combination of applications running on the compute device; retrieving, by the compute device and from a database of the compute device, one or more entries of a plurality of entries of the database, wherein each entry of the plurality of entries is associated with a combination of applications of a plurality of combinations of applications and comprises an indication of the quality of a user experience associated with the corresponding combination of applications; determining, by the compute device, an expected quality of a user experience associated with the current combination of applications based on the one or more indications of the quality of user experiences associated with the one or more entries; and killing, by the compute device, one or more of the current combination of applications based on the expected quality of the user experience associated with the current combination of applications.

Example 17 includes the subject matter of Example 16, and further including receiving, by the compute device and for each of the plurality of combinations of applications, one or more input commands from a user of the compute device to launch each of the applications of the corresponding combination of applications; running, by the compute device and for each of the plurality of combinations of applications, each of the applications of the corresponding combination of applications in response to the corresponding one or more input commands; determining, by the compute device and for each of the plurality of combinations of applications, the indication of quality of the user experience associated with the corresponding combination of applications while the compute device is running the corresponding combination of applications; and storing, by the compute device and for each of the plurality of combinations of applications, the indication of quality of the user experience associated with the corresponding combination of applications in the database.

Example 18 includes the subject matter of any of Examples 16 and 17, and wherein determining, for each of the plurality of combinations of applications, the indication of quality of the user experience associated with the corresponding combination of applications comprises scheduling, by the compute device and for each of at least one combination of applications of the plurality of combinations of applications, a thread to run at a first time; running, by the compute device and for each of the at least one combination of applications, the corresponding thread at a second time; determining, by the compute device and for each of the at least one combination of applications, a time difference between the corresponding second time and the corresponding first time; and determining, by the compute device and for each of the at least one combination of applications, the indication of quality of the user experience associated with the corresponding combination of applications based on the corresponding time difference.

Example 19 includes the subject matter of any of Examples 16-18, and wherein determining, for each of the plurality of combinations of applications, the indication of quality of the user experience associated with the corresponding combination of applications comprises requesting, by the compute device and for each of at least one combination of applications of the plurality of combinations of applications, an allocation of memory of the compute device at a first time; receiving, by the compute device and for each of the at least one combination of applications, the corresponding allocation of memory at a second time; determining, by the compute device and for each of the at least one combination of applications, a time difference between the corresponding second time and the corresponding first time; and determining, by the compute device and for each of the at least one combination of applications, the indication of quality of the user experience associated with the corresponding combination of applications based on the corresponding time difference.

Example 20 includes the subject matter of any of Examples 16-19, and wherein determining, for each of the plurality of combinations of applications, the indication of quality of the user experience associated with the corresponding combination of applications comprises determining, by the compute device and for each of at least one combination of applications of the plurality of combinations of applications, an available amount of memory of the compute device, and determining, by the compute device and for each of the at least one combination of applications, the indication of quality of the user experience associated with the corresponding combination of applications based on the corresponding available amount of memory.

Example 21 includes the subject matter of any of Examples 16-20, and further including receiving, by the compute device and for each of the plurality of combinations of applications, an input from a user of the compute device comprising the corresponding indication of quality of the user experience associated with the corresponding combination of applications, and storing, by the compute device and for each of the plurality of combinations of applications, the indication of quality of the user experience associated with the corresponding combination of applications in the database.

Example 22 includes the subject matter of any of Examples 16-21, and wherein determining the current combination of applications running on the compute device comprises receiving, by the compute device and from a user of the compute device, a command to launch a selected application; determining, by the compute device and in response to receipt of the command to launch the selected application, the current combination of applications running on the compute device, wherein the selected application is included in the current combination of applications; and launching, by the compute device, the selected application, wherein killing the one or more of the current combination of applications comprises killing the one or more of the current combination of applications prior to launching the selected application.

Example 23 includes the subject matter of any of Examples 16-22, and wherein the one or more entries comprise an indication of an acceptable quality of a user experience associated with an acceptable combination of applications including the selected application and one or more additional applications of the current combination, wherein killing the one or more of the current combination of applications comprises determining, by the compute device, that the one or more of the current combination of applications are not included in the acceptable combination of applications.

Example 24 includes the subject matter of any of Examples 16-23, and wherein the one or more entries comprise an indication of an unacceptable quality of a user experience associated with an unacceptable combination of applications including the selected application and one or more additional applications of the current combination, wherein killing the one or more of the current combination of applications comprises determining, by the compute device, that the one or more of the current combination of applications are included in the unacceptable combination of applications.

Example 25 includes the subject matter of any of Examples 16-24, and wherein the one or more entries comprise two or more indications of an acceptable quality of a user experience associated with two or more acceptable combinations of applications including the selected application and one or more additional applications of the current combination, wherein killing the one or more of the current combination of applications comprises determining, by the compute device, which acceptable combination of the two or more acceptable combinations of applications has more applications in common with the current combination of applications, and determining, by the compute device, that the one or more of the current combination of applications are not included in the acceptable combination having the most applications in common with the current combination of applications.

Example 26 includes the subject matter of any of Examples 16-25, and wherein the one or more entries comprise an indication of an unacceptable quality of a user experience associated with the current combination of applications.

Example 27 includes the subject matter of any of Examples 16-26, and wherein the one or more entries comprise an indication of an unacceptable quality of a user experience associated with a combination of applications that includes the current combination of applications and one or more additional applications.

Example 28 includes the subject matter of any of Examples 16-27, and further including determining, by the compute device, a second current combination of applications running on the compute device at a time different from the running of the current combination of applications; determining, by the compute device, whether the database includes any entry indicative of the quality of a user experience associated with the second current combination of applications; and applying, by the compute device and in response to a determination that the database does not include any entry indicative of the quality of a user experience associated with the second current combination of applications, a secondary low memory application killer algorithm.

Example 29 includes the subject matter of any of Examples 16-28, and further including displaying, on a display of the compute device, an interface for a user of the compute device to modify the entries of the plurality of entries of the database; receiving, by the compute device and from the user, an instruction to modify a selected entry of the plurality of entries; and updating, by the compute device, the selected entry of the database based on the instruction from the user.

Example 30 includes the subject matter of any of Examples 16-29, and further including displaying, on a display of the compute device, an interface for a user of the compute device to provide an indication of the quality of a user experience associated with the current combination of applications; receiving, by the compute device and from the user, the indication of quality of the user experience associated with the current combination of applications; and updating, by the compute device, the database based on the indication of quality of the user experience associated with the current combination of applications.

Example 31 includes one or more machine-readable media comprising a plurality of instructions stored thereon that, when executed, cause a compute device to perform the method of any of claims 16-30.

Example 32 includes a compute device comprising means for performing the method of any of claims 16-30.

Example 33 includes a compute device for managing memory use, the compute device comprising means for determining a current combination of applications running on the compute device; means for retrieving, from a database of the compute device, one or more entries of a plurality of entries of the database, wherein each entry of the plurality of entries is associated with a combination of applications of a plurality of combinations of applications and comprises an indication of the quality of a user experience associated with the corresponding combination of applications; means for determining an expected quality of a user experience associated with the current combination of applications based on the one or more indications of the quality of user experiences associated with the one or more entries; and means for killing one or more of the current combination of applications based on the expected quality of the user experience associated with the current combination of applications.

Example 34 includes the subject matter of Example 33, and further including means for receiving, for each of the plurality of combinations of applications, one or more input commands from a user of the compute device to launch each of the applications of the corresponding combination of applications; means for running, for each of the plurality of combinations of applications, each of the applications of the corresponding combination of applications in response to the corresponding one or more input commands; means for determining, for each of the plurality of combinations of applications, the indication of quality of the user experience associated with the corresponding combination of applications while the compute device is running the corresponding combination of applications; and means for storing, for each of the plurality of combinations of applications, the indication of quality of the user experience associated with the corresponding combination of applications in the database.

Example 35 includes the subject matter of any of Examples 33 and 34, and wherein the means for determining, for each of the plurality of combinations of applications, the indication of quality of the user experience associated with the corresponding combination of applications comprises means for scheduling, for each of at least one combination of applications of the plurality of combinations of applications, a thread to run at a first time; means for running, for each of the at least one combination of applications, the corresponding thread at a second time; means for determining, for each of the at least one combination of applications, a time difference between the corresponding second time and the corresponding first time; and means for determining, for each of the at least one combination of applications, the indication of quality of the user experience associated with the corresponding combination of applications based on the corresponding time difference.

Example 36 includes the subject matter of any of Examples 33-35, and wherein the means for determining, for each of the plurality of combinations of applications, the indication of quality of the user experience associated with the corresponding combination of applications comprises means for requesting, for each of at least one combination of applications of the plurality of combinations of applications, an allocation of memory of the compute device at a first time; means for receiving, for each of the at least one combination of applications, the corresponding allocation of memory at a second time; means for determining, for each of the at least one combination of applications, a time difference between the corresponding second time and the corresponding first time; and means for determining, for each of the at least one combination of applications, the indication of quality of the user experience associated with the corresponding combination of applications based on the corresponding time difference.

Example 37 includes the subject matter of any of Examples 33-36, and wherein the means for determining, for each of the plurality of combinations of applications, the indication of quality of the user experience associated with the corresponding combination of applications comprises means for determining, for each of at least one combination of applications of the plurality of combinations of applications, an available amount of memory of the compute device, and means for determining, for each of the at least one combination of applications, the indication of quality of the user experience associated with the corresponding combination of applications based on the corresponding available amount of memory.

Example 38 includes the subject matter of any of Examples 33-37, and further including means for receiving, for each of the plurality of combinations of applications, an input from a user of the compute device comprising the corresponding indication of quality of the user experience associated with the corresponding combination of applications, and means for storing, for each of the plurality of combinations of applications, the indication of quality of the user experience associated with the corresponding combination of applications in the database.

Example 39 includes the subject matter of any of Examples 33-38, and wherein the means for determining the current combination of applications running on the compute device comprises means for receiving, from a user of the compute device, a command to launch a selected application; means for determining, in response to receipt of the command to launch the selected application, the current combination of applications running on the compute device, wherein the selected application is included in the current combination of applications; and means for launching the selected application, wherein the means for killing the one or more of the current combination of applications comprises means for killing the one or more of the current combination of applications prior to launching the selected application.

Example 40 includes the subject matter of any of Examples 33-39, and wherein the one or more entries comprise an indication of an acceptable quality of a user experience associated with an acceptable combination of applications including the selected application and one or more additional applications of the current combination, wherein the means for killing the one or more of the current combination of applications comprises means for determining that the one or more of the current combination of applications are not included in the acceptable combination of applications.

Example 41 includes the subject matter of any of Examples 33-40, and wherein the one or more entries comprise an indication of an unacceptable quality of a user experience associated with an unacceptable combination of applications including the selected application and one or more additional applications of the current combination, wherein the means for killing the one or more of the current combination of applications comprises means for determining that the one or more of the current combination of applications are included in the unacceptable combination of applications.

Example 42 includes the subject matter of any of Examples 33-41, and wherein the one or more entries comprise two or more indications of an acceptable quality of a user experience associated with two or more acceptable combinations of applications including the selected application and one or more additional applications of the current combination, wherein the means for killing the one or more of the current combination of applications comprises means for determining which acceptable combination of the two or more acceptable combinations of applications has more applications in common with the current combination of applications, and means for determining that the one or more of the current combination of applications are not included in the acceptable combination having the most applications in common with the current combination of applications.

Example 43 includes the subject matter of any of Examples 33-42, and wherein the one or more entries comprise an indication of an unacceptable quality of a user experience associated with the current combination of applications.

Example 44 includes the subject matter of any of Examples 33-43, and wherein the one or more entries comprise an indication of an unacceptable quality of a user experience associated with a combination of applications that includes the current combination of applications and one or more additional applications.

Example 45 includes the subject matter of any of Examples 33-44, and further including means for determining a second current combination of applications running on the compute device at a time different from the running of the current combination of applications; means for determining whether the database includes any entry indicative of the quality of a user experience associated with the second current combination of applications; and means for applying, in response to a determination that the database does not include any entry indicative of the quality of a user experience associated with the second current combination of applications, a secondary low memory application killer algorithm.

Example 46 includes the subject matter of any of Examples 33-45, and further including means for displaying, on a display of the compute device, an interface for a user of the compute device to modify the entries of the plurality of entries of the database; means for receiving, from the user, an instruction to modify a selected entry of the plurality of entries; and means for updating the selected entry of the database based on the instruction from the user.

Example 47 includes the subject matter of any of Examples 33-46, and further including means for displaying, on a display of the compute device, an interface for a user of the compute device to provide an indication of the quality of a user experience associated with the current combination of applications; means for receiving, from the user, the indication of quality of the user experience associated with the current combination of applications; and means for updating the database based on the indication of quality of the user experience associated with the current combination of applications.

The invention claimed is:

1. A compute device for managing memory use on the compute device, the compute device comprising:
   an interface; and
   low memory application killer circuitry to:
      determine a current combination of applications running on the compute device;
      retrieve, from a database of the compute device, one or more entries of a plurality of entries of the database, wherein each entry of the plurality of entries is associated with a combination of applications of a plurality of combinations of applications and includes an indication of a quality of a user experience associated with the corresponding combination of applications;
      determine an expected quality of a user experience associated with the current combination of applications based on the one or more indications of the quality of the user experiences associated with the one or more entries; and
      kill one or more of the current combination of applications based on the expected quality of the user experience associated with the current combination of applications.

2. The compute device of claim 1, further including a quality of user experience determination module to:
   receive, for each of the plurality of combinations of applications, one or more input commands from a user of the compute device to launch each of the applications of the corresponding combination of applications;
   run, for each of the plurality of combinations of applications, each of the applications of the corresponding combination of applications in response to the corresponding one or more input commands;
   determine, for each of the plurality of combinations of applications, the indication of the quality of the user experience associated with the corresponding combination of applications while the compute device is running the corresponding combination of applications; and store, for each of the plurality of combinations of applications, the indication of the quality of the user experience associated with the corresponding combination of applications in the database.

3. The compute device of claim 2, wherein to determine, for each of the plurality of combinations of applications, the indication of the quality of the user experience associated with the corresponding combination of applications includes to:
schedule, for each of at least one combination of applications of the plurality of combinations of applications, a thread to run at a first time;
run, for each of the at least one combination of applications, the corresponding thread at a second time;
determine, for each of the at least one combination of applications, a time difference between the corresponding second time and the corresponding first time; and
determine, for each of the at least one combination of applications, the indication of the quality of the user experience associated with the corresponding combination of applications based on the corresponding time difference.

4. The compute device of claim 2, wherein to determine, for each of the plurality of combinations of applications, the indication of quality of the user experience associated with the corresponding combination of applications includes to:
determine, for each of at least one combination of applications of the plurality of combinations of applications, an available amount of memory of the compute device, and
determine, for each of the at least one combination of applications, the indication of quality of the user experience associated with the corresponding combination of applications based on the corresponding available amount of memory.

5. The compute device of claim 1, further including a user experience determination module to:
receive, for each of the plurality of combinations of applications, an input from a user of the compute device including the corresponding indication of quality of the user experience associated with the corresponding combination of applications and
store, for each of the plurality of combinations of applications, the corresponding indication of quality of the user experience associated with the corresponding combination of applications in the database.

6. The compute device of claim 1, wherein to determine the current combination of applications running on the compute device includes to:
receive, from a user of the compute device, a command to launch a selected application;
determine, in response to receipt of the command to launch the selected application, the current combination of applications running on the compute device, wherein the selected application is included in the current combination of applications; and
launch the selected application,
wherein to kill the one or more of the current combination of applications includes to kill the one or more of the current combination of applications prior to the launch of the selected application.

7. The compute device of claim 6, wherein the one or more entries include an indication of an acceptable quality of a user experience associated with an acceptable combination of applications including the selected application and one or more additional applications of the current combination, wherein to kill the one or more of the current combination of applications includes to determine that the one or more of the current combination of applications are not included in the acceptable combination of applications.

8. The compute device of claim 1, wherein the low memory application killer circuitry is further to:
determine a second current combination of applications running on the compute device at a time different from the running of the current combination of applications;
determine whether the database includes any entry indicative of the quality of a user experience associated with the second current combination of applications; and
apply, in response to a determination that the database does not include any entry indicative of the quality of a user experience associated with the second current combination of applications, a secondary low memory application killer algorithm.

9. The compute device of claim 1, further including a quality of user experience determination module to:
display, on a display of the compute device, an interface for a user of the compute device to modify the entries of the plurality of entries of the database;
receive, from the user, an instruction to modify a selected entry of the plurality of entries; and
update the selected entry of the database based on the instruction from the user.

10. A method for managing memory use on a compute device, the method comprising:
determining, by the compute device, a current combination of applications running on the compute device;
retrieving, by the compute device and from a database of the compute device, one or more entries of a plurality of entries of the database, wherein each entry of the plurality of entries is associated with a combination of applications of a plurality of combinations of applications and includes an indication of a quality of a user experience associated with the corresponding combination of applications;
determining, by the compute device, an expected quality of a user experience associated with the current combination of applications based on the one or more indications of the quality of user experiences associated with the one or more entries; and
killing, by the compute device, one or more of the current combination of applications based on the expected quality of the user experience associated with the current combination of applications.

11. The method of claim 10, further including:
receiving, by the compute device and for each of the plurality of combinations of applications, one or more input commands from a user of the compute device to launch each of the applications of the corresponding combination of applications;
running, by the compute device and for each of the plurality of combinations of applications, each of the applications of the corresponding combination of applications in response to the corresponding one or more input commands;
determining, by the compute device and for each of the plurality of combinations of applications, the indication of quality of the user experience associated with the corresponding combination of applications while the compute device is running the corresponding combination of applications; and
storing, by the compute device and for each of the plurality of combinations of applications, the indication of quality of the user experience associated with the corresponding combination of applications in the database.

12. The method of claim 11, wherein determining, for each of the plurality of combinations of applications, the indication of quality of the user experience associated with the corresponding combination of applications includes:
scheduling, by the compute device and for each of at least one combination of applications of the plurality of combinations of applications, a thread to run at a first time;
running, by the compute device and for each of the at least one combination of applications, the corresponding thread at a second time;
determining, by the compute device and for each of the at least one combination of applications, a time difference between the corresponding second time and the corresponding first time; and
determining, by the compute device and for each of the at least one combination of applications, the indication of quality of the user experience associated with the corresponding combination of applications based on the corresponding time difference.

13. The method of claim 10, further including:
receiving, by the compute device and for each of the plurality of combinations of applications, an input from a user of the compute device including the corresponding indication of quality of the user experience associated with the corresponding combination of applications, and
storing, by the compute device and for each of the plurality of combinations of applications, the corresponding indication of quality of the user experience associated with the corresponding combination of applications in the database.

14. The method of claim 10, wherein determining the current combination of applications running on the compute device includes:
receiving, by the compute device and from a user of the compute device, a command to launch a selected application;
determining, by the compute device and in response to receipt of the command to launch the selected application, the current combination of applications running on the compute device, wherein the selected application is included in the current combination of applications; and
launching, by the compute device, the selected application,
wherein killing the one or more of the current combination of applications includes killing the one or more of the current combination of applications prior to launching the selected application.

15. The method of claim 14, wherein the one or more entries include an indication of an acceptable quality of a user experience associated with an acceptable combination of applications including the selected application and one or more additional applications of the current combination, wherein killing the one or more of the current combination of applications includes determining, by the compute device, that the one or more of the current combination of applications are not included in the acceptable combination of applications.

16. The method of claim 10, further including:
determining, by the compute device, a second current combination of applications running on the compute device at a time different from the running of the current combination of applications;
determining, by the compute device, whether the database includes any entry indicative of the quality of a user experience associated with the second current combination of applications; and
applying, by the compute device and in response to a determination that the database does not include any entry indicative of the quality of a user experience associated with the second current combination of applications, a secondary low memory application killer algorithm.

17. The method of claim 10, further including:
displaying, on a display of the compute device, an interface for a user of the compute device to modify the entries of the plurality of entries of the database;
receiving, by the compute device and from the user, an instruction to modify a selected entry of the plurality of entries; and
updating, by the compute device, the selected entry of the database based on the instruction from the user.

18. One or more computer-readable storage media comprising a plurality of instructions stored thereon that, when executed, cause a compute device to at least:
determine a current combination of applications running on the compute device;
retrieve, from a database of the compute device, one or more entries of a plurality of entries of the database, wherein each entry of the plurality of entries is associated with a combination of applications of a plurality of combinations of applications and includes an indication of a quality of a user experience associated with the corresponding combination of applications;
determine an expected quality of a user experience associated with the current combination of applications based on the one or more indications of the quality of the user experiences associated with the one or more entries; and
kill one or more of the current combination of applications based on the expected quality of the user experience associated with the current combination of applications.

19. The one or more computer readable storage media of claim 18, wherein the plurality of instructions further cause the compute device to:
receive, for each of the plurality of combinations of applications, one or more input commands from a user of the compute device to launch each of the applications of the corresponding combination of applications;
run, for each of the plurality of combinations of applications, each of the applications of the corresponding combination of applications in response to the corresponding one or more input commands;
determine, for each of the plurality of combinations of applications, the indication of the quality of the user experience associated with the corresponding combination of applications while the compute device is running the corresponding combination of applications; and
store, for each of the plurality of combinations of applications, the indication of the quality of the user experience associated with the corresponding combination of applications in the database.

20. The one or more computer readable storage media of claim 19, wherein to determine, for each of the plurality of combinations of applications, the indication of the quality of the user experience associated with the corresponding combination of applications includes to:
- schedule, for each of at least one combination of applications of the plurality of combinations of applications, a thread to run at a first time;
- run, for each of the at least one combination of applications, the corresponding thread at a second time;
- determine, for each of the at least one combination of applications, a time difference between the corresponding second time and the corresponding first time; and
- determine, for each of the at least one combination of applications, the indication of the quality of the user experience associated with the corresponding combination of applications based on the corresponding time difference.

21. The one or more computer readable storage media of claim 18, wherein the plurality of instructions further cause the compute device to:
- receive, for each of the plurality of combinations of applications, an input from a user of the compute device including the corresponding indication of quality of the user experience associated with the corresponding combination of applications and
- store, for each of the plurality of combinations of applications, the indication of quality of the user experience associated with the corresponding combination of applications in the database.

22. The one or more computer readable storage media of claim 18, wherein to determine the current combination of applications running on the compute device includes to:
- receive, from a user of the compute device, a command to launch a selected application;
- determine, in response to receipt of the command to launch the selected application, the current combination of applications running on the compute device, wherein the selected application is included in the current combination of applications; and
- launch the selected application, wherein to kill the one or more of the current combination of applications includes to kill the one or more of the current combination of applications prior to the launch of the selected application.

23. The one or more computer readable storage media of claim 22, wherein the one or more entries include an indication of an acceptable quality of a user experience associated with an acceptable combination of applications including the selected application and one or more additional applications of the current combination, wherein to kill the one or more of the current combination of applications includes to determine that the one or more of the current combination of applications are not included in the acceptable combination of applications.

24. The one or more computer readable storage media of claim 18, wherein the plurality of instructions further cause the compute device to:
- determine a second current combination of applications running on the compute device at a time different from the running of the current combination of applications;
- determine whether the database includes any entry indicative of the quality of a user experience associated with the second current combination of applications; and
- apply, in response to a determination that the database does not include any entry indicative of the quality of a user experience associated with the second current combination of applications, a secondary low memory application killer algorithm.

25. The one or more computer readable storage media of claim 18, wherein the plurality of instructions further cause the compute device to:
- display, on a display of the compute device, an interface for a user of the compute device to modify the entries of the plurality of entries of the database;
- receive, from the user, an instruction to modify a selected entry of the plurality of entries; and
- update the selected entry of the database based on the instruction from the user.

* * * * *

UNITED STATES PATENT AND TRADEMARK OFFICE
CERTIFICATE OF CORRECTION

PATENT NO. : 11,113,170 B2  
APPLICATION NO. : 16/311877  
DATED : September 7, 2021  
INVENTOR(S) : Xiaoyong Du Page 1 of 1

It is certified that error appears in the above-identified patent and that said Letters Patent is hereby corrected as shown below:

In the Claims

Claim 9, Column 20, Line 21:
Replace "an interface" with --a user interface--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*